(12) United States Patent
Israel et al.

(10) Patent No.: US 12,411,947 B2
(45) Date of Patent: Sep. 9, 2025

(54) DNS TUNNELING DETECTION AND PREVENTION

(71) Applicant: Check Point Software Technologies Ltd., Tel Aviv (IL)

(72) Inventors: Erez Israel, Tel Aviv (IL); Dan Karpati, Even-Yehuda (IL); Eitan Shterenbaum, Kiryat-Ono (IL); Lior Goldman, Raanana (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 427 days.

(21) Appl. No.: 18/148,183

(22) Filed: Dec. 29, 2022

(65) Prior Publication Data

US 2024/0220613 A1 Jul. 4, 2024

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC .......... G06F 21/554; G06F 2221/033
See application file for complete search history.

(56) References Cited

U.S. PATENT DOCUMENTS

| | | | |
|---|---|---|---|
| 10,498,751 B2* | 12/2019 | Yu | H04L 63/1416 |
| 2018/0278633 A1* | 9/2018 | Brutzkus | H04L 61/5007 |
| 2018/0351976 A1* | 12/2018 | Shitrit-Efergan | H04L 63/1425 |
| 2020/0112574 A1* | 4/2020 | Koral | G06F 16/245 |
| 2021/0126901 A1* | 4/2021 | Rodriguez | G06N 20/20 |
| 2022/0156489 A1* | 5/2022 | Agarwal | G06F 40/106 |
| 2022/0182401 A1* | 6/2022 | Boord | H04L 63/1441 |
| 2022/0245461 A1* | 8/2022 | Sern | G06F 21/566 |
| 2022/0407870 A1* | 12/2022 | Vega | H04L 61/4511 |

OTHER PUBLICATIONS

DNS Tunneling Detection with Supervised Learning (Preston, 2019, IEEE) (Year: 2019).*
Threat Hunting Concepts & Trigger Points: DNS Anomalies (Barlow, 2020) (Year: 2020).*
DNS Tunneling Detection using Machine Learning and Cache Miss Properties (Chowdhary, 2021 IEEE) (Year: 2021).*
Malicious DNS Tunneling Detection in Real-Traffic DNS Data (Lambion, 2020 IEEE) (Year: 2020).*

* cited by examiner

*Primary Examiner* — Philip J Chea
*Assistant Examiner* — Jasmine Mochen Day
(74) *Attorney, Agent, or Firm* — Renner, Otto, Boisselle & Sklar, LLP

(57) ABSTRACT

Methods and devices are provided for differentiating between benign DNS data and malicious DNS data included in DNS traffic using an autoencoder. The autoencoder receives input DNS data and is trained to successfully encode the input DNS data when the input DNS data is benign DNS data and to fail to encode the input DNS data when the input DNS data is malicious DNS data. The autoencoder is trained using a modified loss function having a large weight when successfully encoding malicious DNS data.

19 Claims, 3 Drawing Sheets

DNS TUNNELING DETECTION AND PREVENTION

TECHNICAL FIELD

The present disclosure relates generally to protecting against network-based attacks on devices and more particularly to detecting and preventing Domain Name System (DNS) tunneling.

BACKGROUND

Connected mobile devices (e.g., smart phones, tablets, etc.) are constantly exposed to cyber threats on the internet, and are especially vulnerable to spyware, botnets, phishing sites, and other threats.

Domain Name System (DNS) protocol is a fundamental protocol for any device connectivity. Unfortunately, in most cases this protocol works in clear text (e.g., UDP port 53) against the DNS server dynamically defined on the network that the device connected to (e.g., a Wi-Fi or cellular network). DNS tunneling attacks abuse this protocol to sneak malicious traffic past network and device defenses. By using malicious domains and DNS servers, an attacker can use DNS to evade network defenses and perform data exfiltration.

Malware can use DNS to implement a command and control channel. Inbound DNS traffic can carry commands to the malware, while outbound traffic can exfiltrate sensitive data or provide responses to the malware operator's requests. This works because there are very few restrictions on the data that a DNS request contains. Because almost anything can be a domain name, the fields in a DNS request can be used to carry sensitive information. These requests are designed to go to attacker-controlled DNS servers, ensuring that they can receive the requests and respond in the corresponding DNS replies.

DNS tunneling attacks are simple to perform, and numerous DNS tunneling toolkits exist. This makes it possible for even unsophisticated attackers to use this technique to sneak data past an organization's network security solutions.

SUMMARY

DNS tunneling involves abuse of the underlying DNS protocol. Instead of using DNS requests and replies to perform legitimate IP address lookups, malware uses it to implement a command and control channel with its handler.

The present disclosure provides methods and systems for detecting malicious DNS data using an autoencoder trained to successfully encode benign DNS data and to fail the encoding of malicious DNS data.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
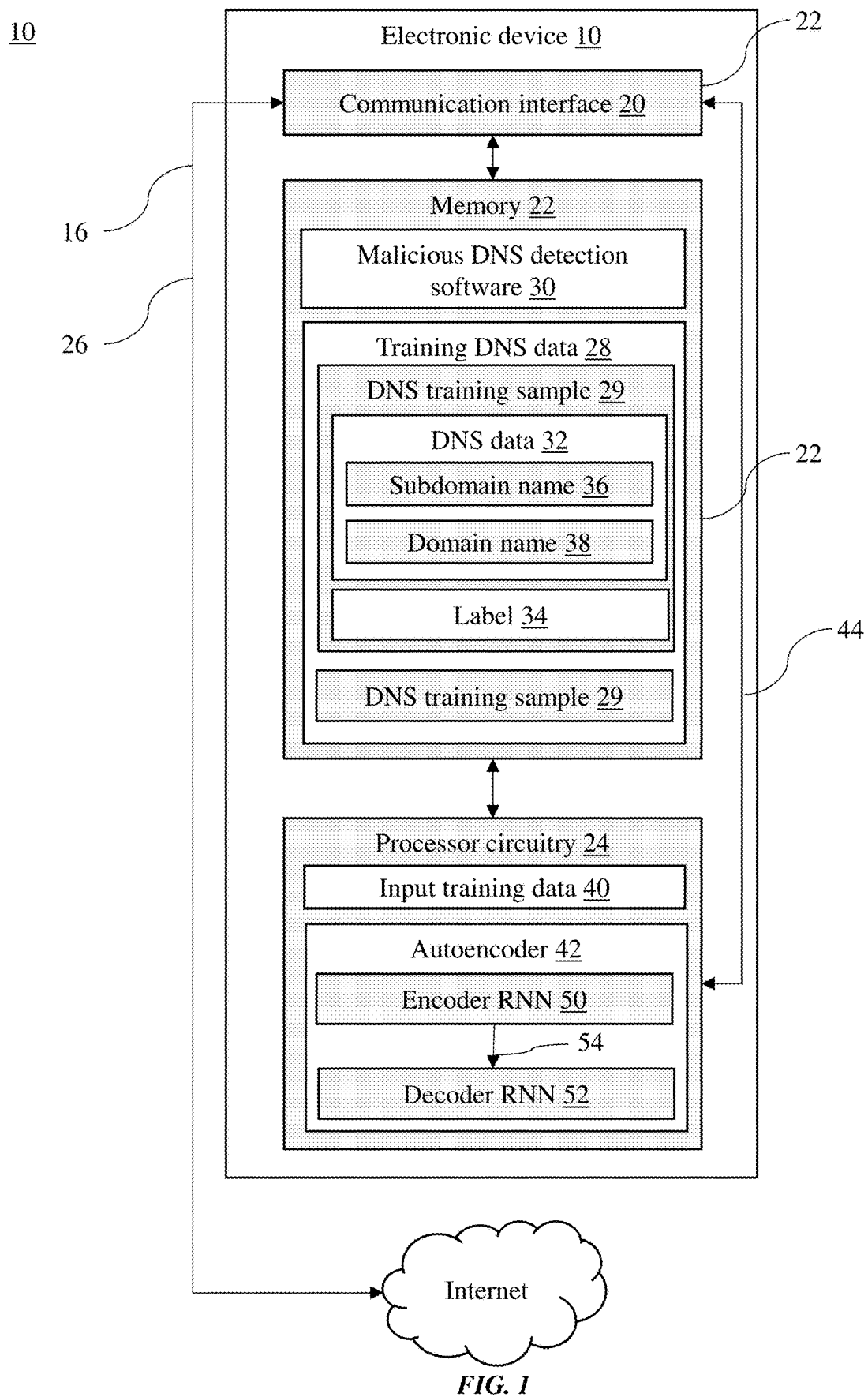
FIG. 1 is a block diagram of an embodiment of an electronic device for differentiating between benign DNS data and malicious DNS data included in DNS traffic.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides methods and devices for differentiating between benign DNS data and malicious DNS data included in DNS traffic using an autoencoder. The autoencoder receives input DNS data and is trained to successfully encode the input DNS data when the input DNS data is benign DNS data and to fail to encode the input DNS data when the input DNS data is malicious DNS data. The autoencoder is trained using a modified loss function having a large weight when successfully encoding malicious DNS data.

Turning to FIG. 1, an electronic device 10 is shown for differentiating between benign DNS data and malicious DNS data included in DNS traffic 16. The electronic device 10 includes a communication interface 20, a memory 22, and processor circuitry 24. The communication interface 20 sends and receives network traffic 26 including the DNS traffic 16. The memory 22 stores training DNS data 28 and malicious DNS detection software 30 comprising machine executable instructions. The training DNS data 28 comprises DNS training samples 29, where each sample includes DNS data 32 and a label 34 identifying the DNS data 32 as malicious or benign. The DNS data 32 includes a subdomain name 36 and a domain name 38. The processor circuitry 24 executes the machine executable instructions of the malicious DNS detection software 30 to classify the DNS traffic 16 by generating input training data 40, training an autoencoder 42 (also referred to as a recurrent neural network (RNN) autoencoder), and analyzing and identifying the DNS traffic 16 as malicious or benign using the trained autoencoder 42.

The processor circuitry 24 generates the input training data 40 from the stored training DNS data 28 by modifying the subdomain 36 for each of the DNS data 32 included in the training DNS data 28 to have a normalized length. The processor circuitry 24 uses the generated input training data 40 to train the autoencoder 42 to receive input DNS data 43 and output an encoding result signal 44, such that the autoencoder 42 successfully encodes the input DNS data 43 when the input DNS data 43 is benign DNS data and the autoencoder fails to encode the input DNS data 43 when the input DNS data 43 is malicious DNS data.

The autoencoder 42 is trained using a modified loss function having a small malicious weight for failing to encode malicious DNS data, a benign weight when failing to encode benign DNS data, and a large malicious weight when successfully encoding malicious DNS data. The large malicious weight is larger than the small malicious weight, such that training of the autoencoder 42 is biased towards failing to encode malicious DNS data. The benign weight may include a large benign weight when failing to encode benign data and a small weight when successfully encoding benign data. When encoding input DNS data 43, the autoencoder 42 outputs an encoding result signal 44 that is determined based on a success of the encoding of the input DNS data 43. The encoding result signal 44 may be normalized by a length of the input DNS data 43 (e.g., to compensate for a positive or negative correlation between a length of the input DNS data 43 and the encoding result signal 44 output by the autoencoder 42).

As described above, the processor circuitry 24 analyzes the DNS traffic 16 using the trained autoencoder 42 and identifies the analyzed DNS traffic 16 as malicious or benign based on the encoding result signal 44 output by the trained autoencoder 42. For example, the encoding result signal may have a value in a range of zero to one and a malicious threshold may be applied to the encoding result signal to determine if the DNS traffic is labeled as malicious or benign. For example, DNS traffic having an encoding result signal more than the malicious threshold may be identified as malicious.

A failure to encode benign DNS data during the training of the autoencoder 42 may result in a larger effect than a failure to encode malicious DNS data due to a ratio of an amount of the benign DNS data to an amount of the malicious DNS data included in the input training data 40 that is larger than two. For example, the input training data 40 may have a ratio of benign DNS data to malicious DNS data of at least 5:1, at least 10:1, at least 100:1, or using any suitable ratio. The larger effect during training of the failure to encode benign DNS data compared to malicious DNS data may be due solely to a ratio of an amount of the benign DNS data to an amount of the malicious DNS data when the small malicious weight and the benign weight are equal. That is, in the loss function, the small malicious weight may be equal to the benign weight. In another embodiment, the effect of failing to encode benign DNS data during training may be amplified by making the benign weight greater than the small malicious weight.

Depending on an amount of malicious DNS data available to use in the input training data 40, the effect of the malicious DNS data during the training of the autoencoder may be increased by duplicating at least some of the malicious DNS included in the input training data 40. That is, the ratio of the benign DNS data to malicious DNS data may be decreased by duplicating at least some of the malicious DNS data included in the input training data 40.

The training DNS data 28 may include any suitable portion or the entirety of DNS traffic 16. For example, the training DNS data 28 may include at least one of: DNS packets, a DNS query, or a subdomain extracted from the DNS query.

An autoencoder is a type of artificial neural network used to learn efficient codings of unlabeled data (i.e., unsupervised learning). The encoding is validated and refined by attempting to regenerate the input from the encoding. The autoencoder 42 may be any suitable neural network for encoding the DNS traffic 16. For example, the autoencoder 42 may be a gated recurrent unit (GRU). The autoencoder may be a timeseries autoencoder that includes information about the order of a DNS query and attempts to reconstruct the DNS query in the correct order.

As described above, each of the DNS data 32 included in the training DNS data 28 may be normalized to have a normalized length. For example, for each of the DNS data 32 having a length greater than the normalized length, the DNS data 32 may be normalized by padding the DNS data 32 with padded characters such that a length of the padded DNS data has a length matching the normalized length. Alternatively or additionally, for each of the DNS data 32 having a length greater than the normalized length, the DNS data 32 may be truncated such that a length of the truncated DNS data has a length matching the normalized length.

Figure 2:
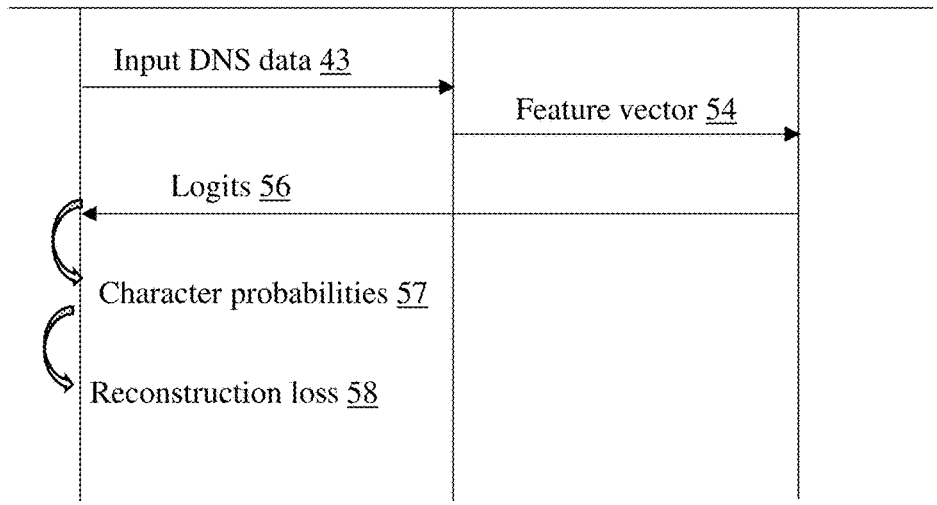
FIG. 2 is a ladder diagram showing processing by processor circuitry of the electronic device.

Turning to FIG. 2, the autoencoder 42 may include an encoder recurrent neural network (RNN) 50 and a decoder RNN 52. The encoder RNN 50 receives the input DNS data 43 and outputs a fixed size feature vector 54. The decoder RNN 52 receives the outputted fixed size feature vector 54 and outputs character logits 56 for each character in the input DNS data 43. For example, if there are N different valid possible characters in a domain, there will be N different logits for each of the input characters. The autoencoder 42 transforms the outputted character logits 56 to character probabilities 57 by normalizing the outputted logits and calculates a reconstruction loss as an average of a negative log loss of the transformed probabilities compared to the characters of the fixed size vector. During the training of the autoencoder 42, when the sample is benign the reconstruction loss is minimized, and when the sample is malicious a reflected loss is minimized. The reflected loss has an optimum opposite an optimum of the reconstruction loss.

The modified loss function may use cross entropy loss to perform "seq to seq" prediction using Teacher forcing. That is, the encoder RNN may read the entire subdomain letter sequence of the input DNS data 43 and produce a vector of size N (the fixed size feature vector). The decoder RNN may predict the sequence letter by letter. When predicting each letter, the decoder RNN may receive an input including the vector of size N and the previous correct letter (i.e., the letter at position t−1 in the subdomain, not the predicted letter at position t−1). The decoder RNN may output logits for the letter at the position t. For example, the decoder RNN may output logits that are a number for each possible letter that is used to calculate the probabilities of each letter at position t. A negative log loss may be applied to the outputted logits as compared to the real subdomain letter sequence. The losses may then be averaged over the domain to determine a reconstruction loss 58.

During training, the modified loss function may be optimized differently for DNS traffic labeled as benign and for DNS traffic labeled as malicious. When a subdomain is labeled as benign, the modified loss function (i.e., the encoder RNN and decoder RNN) may be optimized such that the reconstruction loss is minimal (e.g., minimizing the cross entropy loss). Conversely, when the subdomain is labeled as malicious, a reflected loss function having an optimum opposite the optimum of the reconstruction loss function may be optimized, which pushes for failure of reconstruction of the autoencoder (e.g., maximizing reconstruction loss).

While the previous text predominantly described training of the autoencoder, using the trained autoencoder will now be described (i.e., how the trained autoencoder is used to classify DNS domains. The DNS traffic 16 may be pruned by removing DNS traffic that has been received recently. For example, DNS traffic 16 may be removed having a domain and subdomain found in other DNS traffic 16 within a duration of time. As another example, DNS traffic could be pruned based on previous DNS traffic 16 from a user. For example, DNS traffic could be analyzed by the autoencoder 42 only when the domain and subdomain found in DNS traffic for a user has not been received previously.

Figure 3:
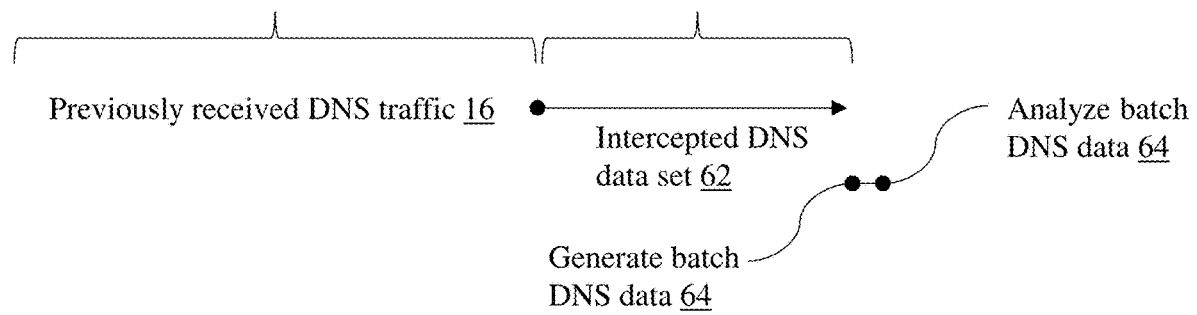
FIG. 3 is an exemplary time diagram depicting collecting DNS data over a duration of time for analyzing as a batch.

Turning to FIG. 3, the analyzing of the DNS traffic 16 using the trained autoencoder 42 may include storing the DNS traffic 16 received by the communication interface over a batch time duration 60 in an intercepted DNS data set 62. Batch DNS data 64 may be generated by removing from the intercepted DNS data set 62 the DNS traffic 16 including a subdomain found in previously received DNS traffic 16. For example, the previously received DNS traffic may have been received over a recent history time duration 66 that is longer than the batch time duration 60. In this example, at an end of the batch time duration 60, the generated batch DNS data 64 may be analyzed using the trained autoencoder 42. Alternatively or additionally, when the intercepted DNS data set 62 includes an amount of DNS traffic greater than a DNS threshold, the generated batch DNS data 64 may be analyzed using the trained autoencoder 42.

The electronic device 10 may be any suitable computer device. For example, the electronic device 10 may be a network gateway, end point, or server. In one embodiment, the electronic device 10 is a server configured to receive DNS traffic 16 from network gateways and/or end points. For example, the server may receive DNS traffic 16 worldwide, from a specific region (e.g., the US or Europe), etc.

As described above, the electronic device 10 identifies the analyzed DNS traffic as malicious or benign. The DNS traffic identified as malicious may be compiled in a list (e.g., adding newly identified malicious domains to an existing list of malicious domains) and propagated to enforcement points (e.g. gateways or endpoints). In this way, a malicious domain (e.g., a combination of a subdomain and domain, a domain, or a subdomain) identified in DNS traffic received for one user, may be used to protect other unrelated users from an identified malicious domain by restricting DNS traffic related to the identified malicious domain.

A domain may be identified as malicious when a number of unique DNS requests to the domain that were identified as malicious is greater than a threshold. Alternatively or additionally, a domain may be identified as malicious when a ratio between malicious requests (i.e., DNS traffic identified as malicious) to benign requests (i.e., DNS traffic identified as benign) is greater than or equal to a threshold (e.g., 0.5). When a domain meets the number of unique malicious DNS requests threshold and meets the ratio threshold for benign to malicious requests, the entire domain (i.e., all subdomains of the domain) may be identified as malicious.

Figure 4:
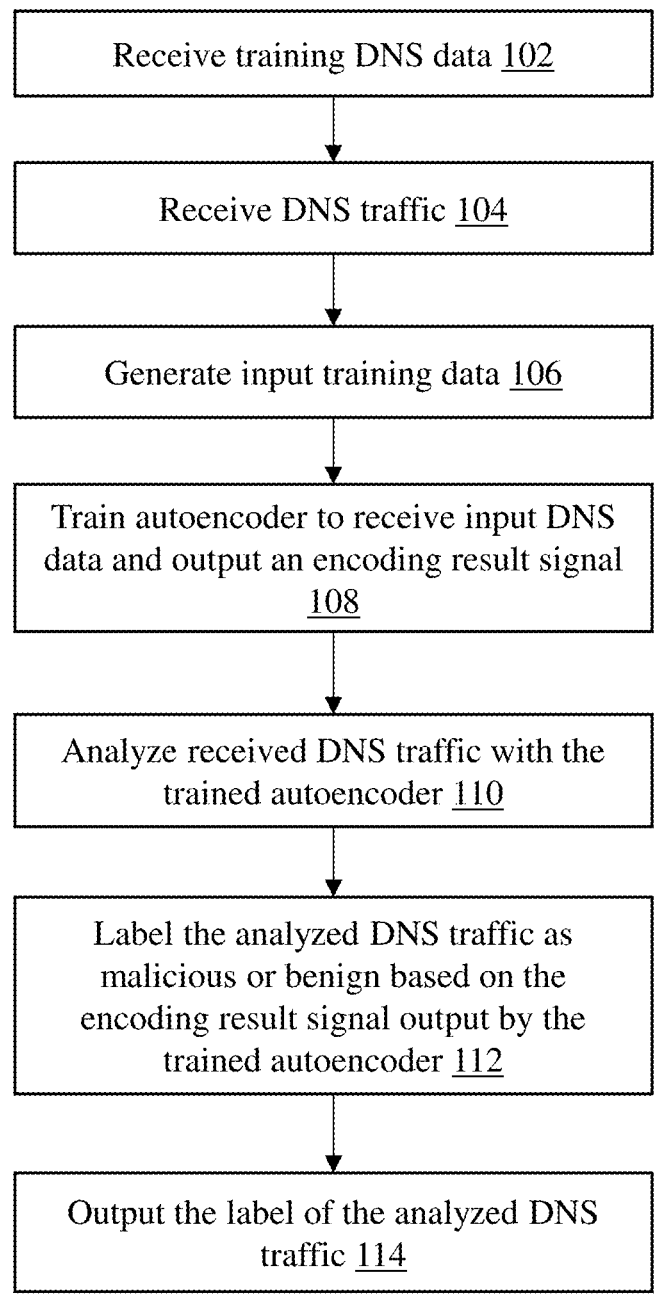
FIG. 4 is a flow diagram of an embodiment of a method performed using processor circuitry for differentiating between benign DNS data and malicious DNS data included in DNS traffic.

Turning to FIG. 4, a method 100 performed using processor circuitry is shown for differentiating between benign DNS data and malicious DNS data included in DNS traffic 16. In step 102, training DNS data 28 is received by the processor circuitry 24. As described above, the training DNS data 28 comprises DNS training samples 29, where each sample includes DNS data 32 and a label 34 identifying the DNS data 32 as malicious or benign. The DNS data 32 includes a subdomain 36 and a domain name 38. In step 104, DNS traffic is received by the processor circuitry 24. In step 106, the input training data is generated from the stored training DNS data with the processor circuitry by modifying the subdomain for each of the DNS data included in the training DNS data to have a normalized length.

In step 108, the processor circuitry trains an autoencoder, using the generated input training data, to receive input DNS data 43 and output an encoding result signal, such that the autoencoder successfully encodes the input DNS data 43 when the input DNS data 43 is benign DNS data and the autoencoder fails to encode the input DNS data 43 when the input DNS data 43 is malicious DNS data. As described above, the autoencoder is trained using a modified loss function configured to have a small malicious weight for failing to encode malicious DNS data, to have a benign weight when failing to encode benign DNS data, and to have a large malicious weight when successfully encoding malicious DNS data. The large malicious weight is larger than the small malicious weight and the encoding result signal is determined based on a success of the encoding of the input DNS data 43.

In step 110, received DNS traffic is analyzed using the trained autoencoder. In step 112, the analyzed DNS traffic is labeled as malicious or benign based on the encoding result signal output by the trained autoencoder. In step 114, the label of the analyzed DNS traffic is output.

The processor circuitry 24 may have various implementations. For example, the processor circuitry 24 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 24 may be located on one or more discrete and separate pieces of hardware (e.g., the communication interface 20 and the processor 28). The processor circuitry 24 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 24. The processor circuitry 24 may be communicatively coupled to the computer readable medium and communication interface through a system bus, mother board, or using any other suitable structure known in the art.

The memory 22 may be any suitable computer readable medium, such as one or more of a buffer, a flash memory, a hard drive, a removable media, a volatile memory, a nonvolatile memory, a random-access memory (RAM), or other suitable device. In a typical arrangement, the memory 22 may include a non-volatile memory for long term data storage and a volatile memory that functions as system memory for the processor 16. The memory 22 may exchange data with the processor circuitry 24 over a data bus. Accompanying control lines and an address bus between the memory 22 and the processor circuitry 24 also may be present. The memory 22 is considered a non-transitory computer readable medium.

The communication interface 20 may be any suitable device for sending and receiving network traffic including DNS traffic. For example, the communication interface 20 may comprise a wireless network adaptor, an Ethernet network card, or any suitable device that provides an interface to a network. The communication interface 20 may be communicatively coupled to the computer readable medium, such that the communication interface 20 is able to send data stored on the computer readable medium across the network and store received data on the computer readable medium 20. The communication interface 20 may also be communicatively coupled to the circuitry such that the circuitry is able to control operation of the communication interface 20. The communication interface 20, computer readable medium, and circuitry may be communicatively coupled through a system bus, mother board, or using any other suitable manner as will be understood by one of ordinary skill in the art.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electronic device for differentiating between benign Domain Name System (DNS) data and malicious DNS data included in DNS traffic, the electronic device comprising:
   a communication interface configured to send and receive network traffic including the DNS traffic;
   a memory configured to store malicious DNS detection software comprising machine executable instructions, wherein each of the DNS traffic includes a subdomain and a domain name; and
   processor circuitry configured to execute the machine executable instructions to classify the DNS traffic by:
   modifying the subdomain for each of the DNS traffic received by the communication interface to have a normalized length;
   analyzing the DNS traffic using a trained autoencoder configured to receive input DNS data and output an encoding result signal, such that the autoencoder successfully encodes the input DNS data when the input DNS data is benign DNS data and the autoencoder fails to encode the input DNS data when the input DNS data is malicious DNS data, wherein the encoding result signal is determined based on a success of the encoding of the input DNS data; and
   labeling the analyzed DNS traffic as malicious or benign based on the encoding result signal output by the trained autoencoder; and
   outputting the label of the analyzed DNS traffic;
   wherein the memory is further configured to store training DNS data, wherein:
   the training DNS data comprises DNS training samples;
   each DNS training sample includes DNS data and a label identifying the DNS data as malicious or benign; and
   the DNS data traffic includes a subdomain and a domain name; and wherein the processor circuitry is further configured to execute the machine executable instructions to classify the DNS traffic by:
generating input training data from the stored training DNS data by modifying the subdomain for each of the DNS data included in the training DNS data to have a normalized length; and
training the autoencoder, using the generated input training data and a modified loss function configured to have a small malicious weight for failing to encode malicious DNS data, to have a benign weight when failing to encode benign DNS data, and to have a large malicious weight when successfully encoding malicious DNS data, wherein the large malicious weight is larger than the small malicious weight.

2. The electronic device of claim 1, wherein a failure to encode benign DNS data during the training of the autoencoder results in a larger effect than a failure to encode malicious DNS data due to a ratio of an amount of the benign DNS data to an amount of the malicious DNS data included in the input training data that is larger than two.

3. The electronic device of claim 1, wherein the effect of the malicious DNS data during the training of the autoencoder is increased by duplicating at least some of the malicious DNS included in the input training data.

4. The electronic device of claim 1, wherein the training DNS data comprises at least one of: DNS packets, a DNS query, or a subdomain extracted from the DNS query.

5. The electronic device of claim 1, wherein:
the autoencoder includes an encoder recurrent neural network (RNN) and a decoder RNN;
the encoder RNN receives the input DNS data and outputs a fixed size feature vector;
the decoder RNN receives the outputted fixed size feature vector and outputs character logits for each character in the fixed size feature vector;
the autoencoder is configured to:
transform the outputted character logits to character probabilities by normalizing the outputted logits; and
calculate as a reconstruction loss an average of a negative log loss of the transformed probabilities compared to the characters of the fixed size vector; and
during the training of the autoencoder:
when the sample is benign, the reconstruction loss is minimized; and
when the sample is malicious, a reflected loss is minimized, wherein the reflected loss has an optimum opposite an optimum of the reconstruction loss.

6. The electronic device of claim 1, wherein:
the analyzing of the DNS traffic using the trained autoencoder includes:
storing the DNS traffic received by the communication interface over a batch time duration in an intercepted DNS data set;
generating batch DNS data by removing from the intercepted DNS data set the DNS traffic including a subdomain found in previously received DNS traffic; and
at an end of the batch time duration, analyzing the generated batch DNS data using the trained autoencoder;
the previously received DNS traffic was received over a recent history time duration; and
the recent history time duration is longer than the batch time duration.

7. The electronic device of claim 1, wherein:
the analyzing of the received DNS traffic using the trained autoencoder includes:
storing the DNS traffic in an intercepted DNS data set;
generating batch DNS data by removing from the intercepted DNS data set the DNS traffic including a subdomain found in previously received DNS traffic; and
when the intercepted DNS data set includes an amount of DNS traffic greater than a DNS threshold, analyzing the generated batch DNS data using the trained autoencoder; and
the previously received DNS traffic was received over a recent history time duration.

8. The electronic device of claim 1, wherein the modifying of each of the DNS data included in the training DNS data to have a normalized length includes at least one of:
for each of the DNS data having a length less than the normalized length, padding the DNS data with padded characters such that a length of the padded DNS data has a length matching the normalized length; or
for each of the DNS data having a length greater than the normalized length, truncating the DNS data such that a length of the truncated DNS data has a length matching the normalized length.

9. The electronic device of claim 1, wherein the processor circuitry is further configured to normalize the encoding result signal based on a length of the input DNS data.

10. A method performed using processor circuitry for differentiating between benign Domain Name System (DNS) data and malicious DNS data included in DNS traffic, the method comprising:
receiving training DNS data with the processor circuitry, wherein:
the training DNS data comprises DNS training samples;
each DNS training sample includes DNS data and a label identifying the DNS data as malicious or benign; and
the DNS data includes a subdomain and a domain name;
receiving the DNS traffic;
generating input training data from the stored training DNS data with the processor circuitry by modifying the subdomain for each of the DNS data included in the training DNS data to have a normalized length;
training with the processor circuitry an autoencoder, using the generated input training data, to receive input DNS data and output an encoding result signal, such that the autoencoder successfully encodes the input DNS data when the input DNS data is benign DNS data and the autoencoder fails to encode the input DNS data when the input DNS data is malicious DNS data, wherein:
the autoencoder is trained using a modified loss function configured to have a small malicious weight for failing to encode malicious DNS data, to have a benign weight when failing to encode benign DNS data, and to have a large malicious weight when successfully encoding malicious DNS data;
the large malicious weight is larger than the small malicious weight;
the encoding result signal is determined based on a success of the encoding of the input DNS data;

analyzing the received DNS traffic using the trained autoencoder;

labeling the analyzed DNS traffic as malicious or benign based on the encoding result signal output by the trained autoencoder; and outputting the label of the analyzed DNS traffic.

11. The method of claim 10, wherein a failure to encode benign DNS data during the training of the autoencoder results in a larger effect than a failure to encode malicious DNS data due to a ratio of an amount of the benign DNS data to an amount of the malicious DNS data included in the input training data that is larger than two.

12. The method of claim 11, wherein the small malicious weight and the benign weight are equal.

13. The method of claim 10, wherein the effect of the malicious DNS data during the training of the autoencoder is increased by duplicating at least some of the malicious DNS included in the input training data.

14. The method of claim 10, wherein the training DNS data comprises at least one of: DNS packets, a DNS query, or a subdomain extracted from the DNS query.

15. The method of claim 10, wherein:

the autoencoder includes an encoder recurrent neural network (RNN) and a decoder RNN;

the encoder RNN receives the input DNS data and outputs a fixed size feature vector;

the decoder RNN receives the outputted fixed size feature vector and outputs character logits for each character in the fixed size feature vector;

the analyzing of the received DNS traffic using the trained autoencoder includes:

transforming the outputted character logits to character probabilities by normalizing the outputted logits; and calculating as a reconstruction loss an average of a negative log loss of the transformed probabilities compared to the characters of the fixed size vector; and the training of the autoencoder includes:

when the sample is benign, minimizing the reconstruction loss; and when the sample is malicious, minimizing a reflected loss, wherein the reflected loss has an optimum opposite an optimum of the reconstruction loss.

16. The method of claim 10, wherein:

the analyzing of the DNS traffic using the trained autoencoder includes:

storing the DNS traffic received over a batch time duration in an intercepted DNS data set;

generating batch DNS data by removing from the intercepted DNS data set the DNS traffic including a subdomain found in previously received DNS traffic; and at an end of the batch time duration, analyzing the generated batch DNS data using the trained autoencoder;

the previously received DNS traffic was received over a recent history time duration; and the recent history time duration is longer than the batch time duration.

17. The method of claim 10, wherein:

the analyzing of the DNS traffic using the trained autoencoder includes:

storing the DNS traffic received in an intercepted DNS data set;

generating batch DNS data by removing from the intercepted DNS data set the DNS traffic including a subdomain found in previously received DNS traffic; and when the intercepted DNS data set includes an amount of DNS traffic greater than a DNS threshold, analyzing the generated batch DNS data using the trained autoencoder; and the previously received DNS traffic was received over a recent history time duration.

18. The method of claim 10, wherein the modifying of each of the DNS data included in the training DNS data to have a normalized length includes at least one of:

for each of the DNS data having a length less than the normalized length, padding the DNS data with padded characters such that a length of the padded DNS data has a length matching the normalized length; or for each of the DNS data having a length greater than the normalized length, truncating the DNS data such that a length of the truncated DNS data has a length matching the normalized length.

19. A non-transitory computer readable memory having software embodied thereon for performing the method of claim 10 when the software is executed by processor circuitry.

* * * * *